United States Patent
Kamalov (10) Patent No.: US 9,225,457 B2
(45) Date of Patent: Dec. 29, 2015

(54) OVERLAPPING SPECTRUM IN OPTICAL COMMUNICATION

(71) Applicant: Google Inc., Mountain View, CA (US)

(72) Inventor: Valey Kamalov, Gainesville, FL (US)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 14/151,938

(22) Filed: Jan. 10, 2014

(65) Prior Publication Data

US 2015/0200743 A1    Jul. 16, 2015

(51) Int. Cl.
*H04J 14/02*    (2006.01)

(52) U.S. Cl.
CPC ......... *H04J 14/0202* (2013.01); *H04J 14/0201* (2013.01); *H04J 14/021* (2013.01); *H04J 14/0212* (2013.01)

(58) Field of Classification Search
CPC . H04J 14/0201; H04J 14/0213; H04J 14/021; H04J 14/0212
See application file for complete search history.

(56) References Cited

U.S. PATENT DOCUMENTS

| | | | |
|---|---|---|---|
| 6,351,581 B1 | 2/2002 | Doerr et al. | |
| 7,043,159 B1 | 5/2006 | Solheim | |
| 7,068,938 B1 | 6/2006 | Islam et al. | |
| 7,254,337 B1 | 8/2007 | Islam et al. | |
| 8,089,683 B2 | 1/2012 | Holmes | |
| 8,483,564 B2 | 7/2013 | Mu et al. | |
| 2001/0031113 A1 | 10/2001 | Frish et al. | |
| 2002/0101882 A1 | 8/2002 | Kim | |
| 2004/0013355 A1* | 1/2004 | Margalit | 385/27 |
| 2012/0170928 A1 | 7/2012 | Tanaka et al. | |
| 2012/0177362 A1* | 7/2012 | Zhang et al. | 398/9 |
| 2012/0243879 A1* | 9/2012 | Nashimoto et al. | 398/140 |
| 2012/0301141 A1 | 11/2012 | Sakamoto et al. | |
| 2013/0302028 A1 | 11/2013 | Barnard | |

FOREIGN PATENT DOCUMENTS

| | | |
|---|---|---|
| EP | 1884044 B1 | 10/2010 |
| EP | 2445129 A1 | 4/2012 |
| JP | 2012119925 A | 6/2012 |

OTHER PUBLICATIONS

Internation Search Report and Written Opinion for PCT Application No. PCT/US2014/066123 dated Feb. 4, 2015.

* cited by examiner

*Primary Examiner* — Leslie Pascal
(74) *Attorney, Agent, or Firm* — Honigman Miller Schwartz and Cohn LLP (57) ABSTRACT

An optical add-drop multiplexer including a first filter filtering a first band of wavelengths of a communication spectrum for a first communication and a second filter filtering a second band of wavelengths of the communication spectrum for a second communication. The second band of wavelengths overlaps the first band of wavelengths in an overlap band of wavelengths. The first band of wavelengths includes a first fraction of the overlap band of wavelengths for the first communication and the second band of wavelengths includes a remaining fraction the overlap band of wavelengths for the second communication.

15 Claims, 6 Drawing Sheets

OVERLAPPING SPECTRUM IN OPTICAL COMMUNICATION

TECHNICAL FIELD

This disclosure relates to overlapping spectrum in optical communication.

BACKGROUND

Initially introduced to connect two points across the ocean, submarine cable networks became more flexible with the introduction of optical add-drop multiplexers (OADM). OADMs used in optical communication networks are capable of removing wavelength channels from multiple wavelength signals and adding channels to those signals. Conventional OADMs have typically been limited to use in a relatively few nodes within a network because of their inherent performance characteristics. In other words, as the number of conventional OADMs increases within the network, the imitations associated with conventional OADMs substantially affects network performance.

SUMMARY

One aspect of the disclosure provides an optical add-drop multiplexer that includes a first filter filtering a first band of wavelengths of a communication spectrum for a first communication and a second fitter filtering a second band of wavelengths of the communication spectrum for a second communication. The second band of wavelengths overlaps the first band of wavelengths in an overlap band of wavelengths with no guard band between the first band and the second band. The first band of wavelengths includes a first fraction of the overlap band of wavelengths for the first communication and the second band of wavelengths includes a remaining fraction the overlap band of wavelengths for the second communication.

Implementations of the disclosure may include one or more of the following features. In some implementations, the first band of wavelengths includes the entire overlap band of wavelengths for the first communication and the second band of wavelengths excludes the overlap band of wavelengths from the second communication.

The overlap band of wavelengths may include common wavelengths between a spectral edge of the first band of wavelengths and a spectral edge of the second band of wavelengths. In some examples, the first filter and/or the second filter provide a fixed sized overlap band of wavelengths of the communication spectrum. In other examples, the first filter and/or the second fitter are tunable to provide a variable sized overlap band of wavelengths of the communication spectrum. The filtering may include adding, dropping, and/or reusing wavelengths.

Another aspect of the disclosure provides an optical system that includes a first trunk terminal, a second trunk terminal, and a communication trunk coupling the first trunk terminal to the second trunk terminal. The system also includes a branching unit disposed along the communication trunk and coupling a branch terminal to the communication trunk. The branching unit includes an optical add-drop multiplexer having first and second filters. The first filter filters a first band of wavelengths of a communication spectrum for a first communication, and the second filter filters a second band of wavelengths of the communication spectrum for a second communication. The second band of wavelengths overlaps the first band of wavelengths in an overlap band of wavelengths with no guard band between the first band and the second band. The first band of wavelengths includes a first fraction of the overlap band of wavelengths for the first communication and the second band of wavelengths includes a remaining fraction the overlap band of wavelengths for the second communication.

In some implementations, the first band of wavelengths includes the entire overlap band of wavelengths for the first communication and the second band of wavelengths excludes the overlap band of wavelengths from the second communication. The overlap band of wavelengths may be reserved for communications between the first and second trunk terminals.

The overlap band of wavelengths may include common wavelengths between a spectral edge of the first band of wavelengths and a spectral edge of the second band of wavelengths. In some examples, the first filter and/or the second filter provide a fixed sized overlap band of wavelengths of the communication spectrum. In other examples, the first filter and/or the second filter are tunable to provide a variable sized overlap band of wavelengths of the communication spectrum. The filtering may include adding, dropping, and/or reusing wavelengths.

Yet another aspect of the disclosure provides a method of optical communication that includes filtering first band of wavelengths of a communication spectrum for a first communication and filtering a second band of wavelengths of the communication spectrum for a second communication. The second band of wavelengths overlaps the first band of wavelengths in an overlap band of wavelengths with no guard band between the first band and the second band. The first band of wavelengths includes a first fraction of the overlap band of wavelengths for the first communication and the second band of wavelengths includes a remaining fraction the overlap band of wavelengths for the second communication.

In some implementations, the first band of wavelengths includes the entire overlap band of wavelengths for the first communication and the second band of wavelengths excludes the overlap band of wavelengths from the second communication. Other delegations of the overlap band are possible as well.

The overlap band of wavelengths may include common wavelengths between a spectral edge of the first band of wavelengths and a spectral edge of the second hand of wavelengths. In some examples, the first filter and/or the second filter provide a fixed sized overlap band of wavelengths of the communication spectrum. In other examples, the first filter and/or the second filter are tunable to provide a variable sized overlap band of wavelengths of the communication spectrum. The filtering may include adding, dropping, and/or reusing wavelengths.

In some implementations, the method includes receiving the first communication from a first trunk terminal, where the first communication is destined for a second trunk terminal coupled by a communication trunk with the first trunk terminal. The method also includes receiving the second communication from a branch terminal coupled to the communication trunk. The overlap band of wavelengths may be reserved for communications between the first and second trunk terminals.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
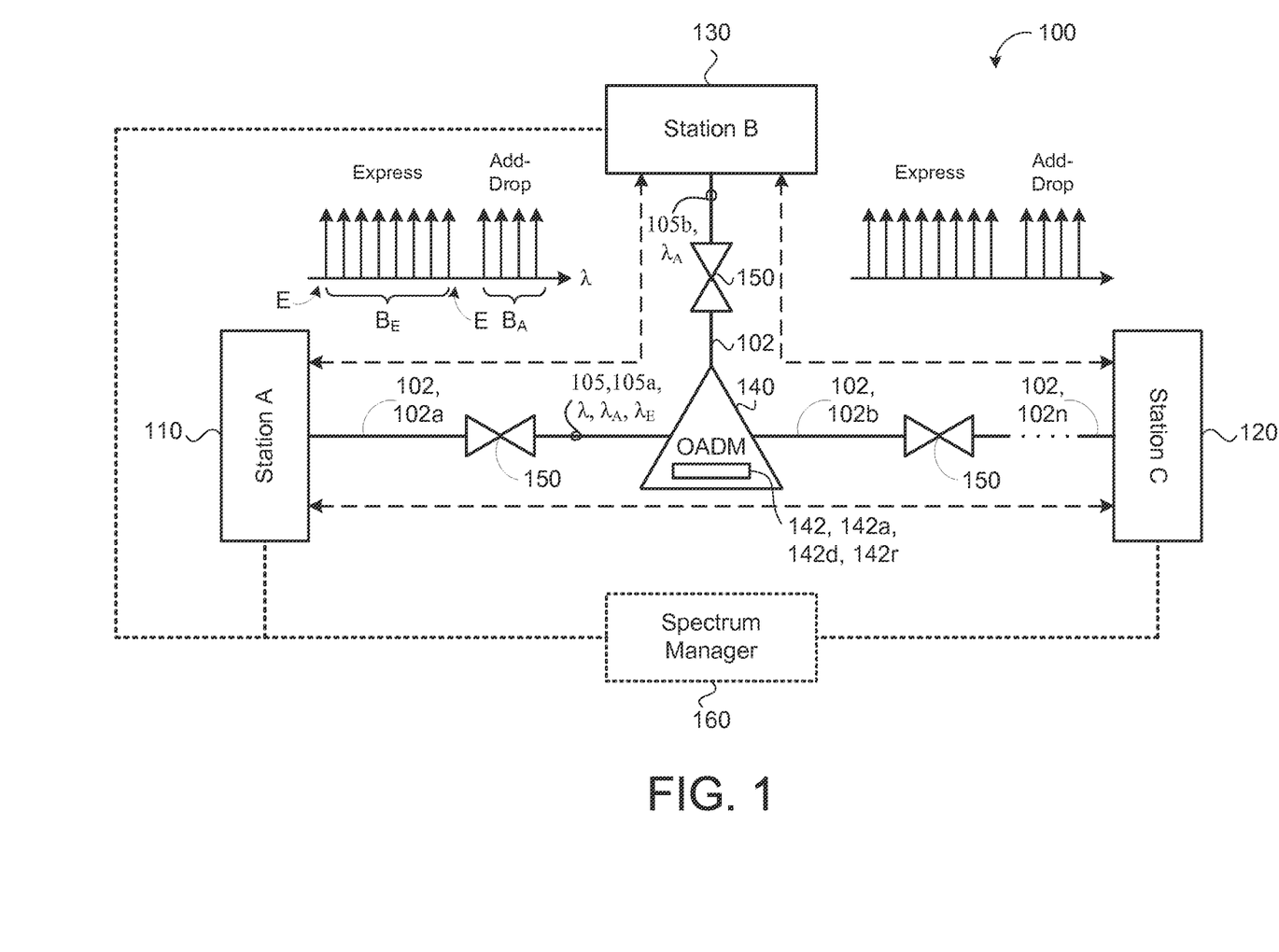
FIG. 1 is a schematic view of an exemplar optical communication system.

Referring to FIG. 1, an optical communication system 100 includes first and second trunk terminals 110, 120 (also referred to as stations) coupled to a communication trunk 102. The coupling may be any connection, link or the like by which signals carried by one system element are imparted to the "coupled" element. The coupled elements may not necessarily be directly connected to one another and may be separated by intermediate components or devices that may manipulate or modify the signals. The communication trunk 102 may include a plurality of optical cable segments 102, 102a-n (e.g., optical submarine cables) that carry optical signals 105 on associated optical channels/wavelengths $\lambda$.

One or more branch terminals 130 may be coupled to the communication trunk 102 between the first and second trunk terminals 110, 120 by corresponding branching units 140. A branching unit 140 may be an OADM branching unit. Moreover, one or more repeaters 150 and linking optical cables 102 may couple the branch terminal 130 to its corresponding branching unit 140. The system 100 may therefore be configured to provide bi-directional or uni-directional communication of optical signals 105 between terminals 110, 120, 130.

Branching units 140 may impart spectral distortion. Reducing spectral distortion in pass-through wavelengths $\lambda$ can be as important as reducing insertion losses for the corresponding signals 105. Spectral distortion in adjacent signal wavelengths $\lambda$ can be controlled by reducing the number of times that any one signal experiences an adjacent signal being added/dropped. This can be done, for example, by simultaneously adding/dropping a band B of wavelengths $\lambda$ at each OADM 140. The terms "add/drop," "adding/dropping," and "added/dropped" refer to either the operation of adding one or more wavelengths $\lambda$, dropping one or more wavelengths $\lambda$, or adding wavelengths $\lambda$ and dropping others. Those terms are not intended to require both add and drop operations, but are also not intended to exclude add and drop operations. The terms are merely used as a convenient way to refer to either adding or dropping or both adding and dropping operations.

In general, the branching units 140 may add and drop channels $\lambda$ to/from the communication trunk 102. In some implementations, a wavelength division multiplexing (WDM) signal 105 may originate at one or more of the terminals 110, 120, 130, and the branching units 140 may be configured either to pass some channels $\lambda$ through the branching units 140 to travel uninterruptedly through the communication trunk 102 from an originating trunk terminal 110, 120 to a receiving trunk terminal 110, 120 or other branching unit 140. The branching units 140 may add or drop one or more other channels $\lambda$ to/from the branch terminals 130. For example, a WDM signal 105 originating at the first trunk terminal 110 may include information occupying one or more channels $\lambda$. Likewise, a WDM signal 105 originating at the branch terminal 130 may occupy one or more channels $\lambda$. Both WDM signals 105 may be transmitted to the branching unit 140 that passes certain channels $\lambda$ therethrough from the originating, first trunk terminal 110 along the communication trunk 102 without interruption to the second trunk terminal 120. The branching unit 140 may be configured to drop, i.e., extract information from, one or more channels $\lambda$ originating from the first trunk terminal 110 and pass the dropped channels $\lambda$ to the branch terminal 130. The branching unit 140 may also be configured to add, i.e. insert information on, certain channels $\lambda$ originating from branch terminal 130 to the WDM signal 105 originating from the first trunk terminal 110 and pass the resulting WDM signal 105 (that includes the added information) onto the second trunk terminal 120. In some examples, the WDM signal 105 originating from the first trunk terminal 110 is fully terminated at branching unit 140, in which case only the added information from branch terminal 130 would be passed onto the second trunk terminal 120. Other branching units 140 may similarly pass through, add, and/or drop certain channels $\lambda$.

Any branching unit 140 may be disposed in an undersea environment and may be seated on the ocean floor, Additionally or alternatively, the branching unit 140 may be in a terrestrial environment and may be co-located at the same central office as the branch terminal 130. The communication trunk 102 may thus span between beach landings, or may provide a terrestrial connection between two terminal stations.

Each cable segment 102 may include one or more sections of fiber optic cable including optical fiber pairs and one or more repeaters 150 to provide a transmission path for bi-directional communication of optical signals 105 between the first and second trunk terminals 110, 120. The system 100 may be configured as a long-haul system, e.g. having a length between at least two of the terminals 110, 120, 130 of more than about 600 km, and may span a body of water, e.g., an ocean.

The repeater(s) 150 may include any optical amplifier/repeater configuration that compensates for signal attenuation on the transmission path. For example, one or more repeaters 130 may be configured as an optical amplifier, such as an erbium doped fiber amplifier, a Raman amplifier, or a hybrid Raman/EDFA amplifier. Also, one or more repeaters 150 may have an optical-electrical-optical configuration that regenerates an optical signal by converting it to an electrical signal, processing the electrical signal and then retransmitting the optical signal. A system bandwidth may coincide with the usable bandwidth of the optical amplifiers within the system 100.

Multiple terminals/stations 110, 120, 130 share optical bandwidth of the same fiber pair 102 by separating the whole spectrum into bands B using optical filters in the OADMs 140. A band B includes two or more wavelengths $\lambda$ (also referred to as channels) residing spectrally adjacent to one another. By adding/dropping one or more bands B of signal wavelengths $\lambda$ at each OADM 140, only signals 105 having wavelengths $\lambda$ adjacent to the spectral edges E of the band B are affected by asymmetry penalties and high loss. The term "spectral edge" refers to the wavelength $\lambda$ contained within a band B of wavelengths $\lambda$ that is immediately adjacent to a wavelength $\lambda$ not included within that particular band B of wavelengths $\lambda$. None of the signals 105 having wavelengths $\lambda$ within the added/dropped band experience this spectral distortion.

Figure 2:
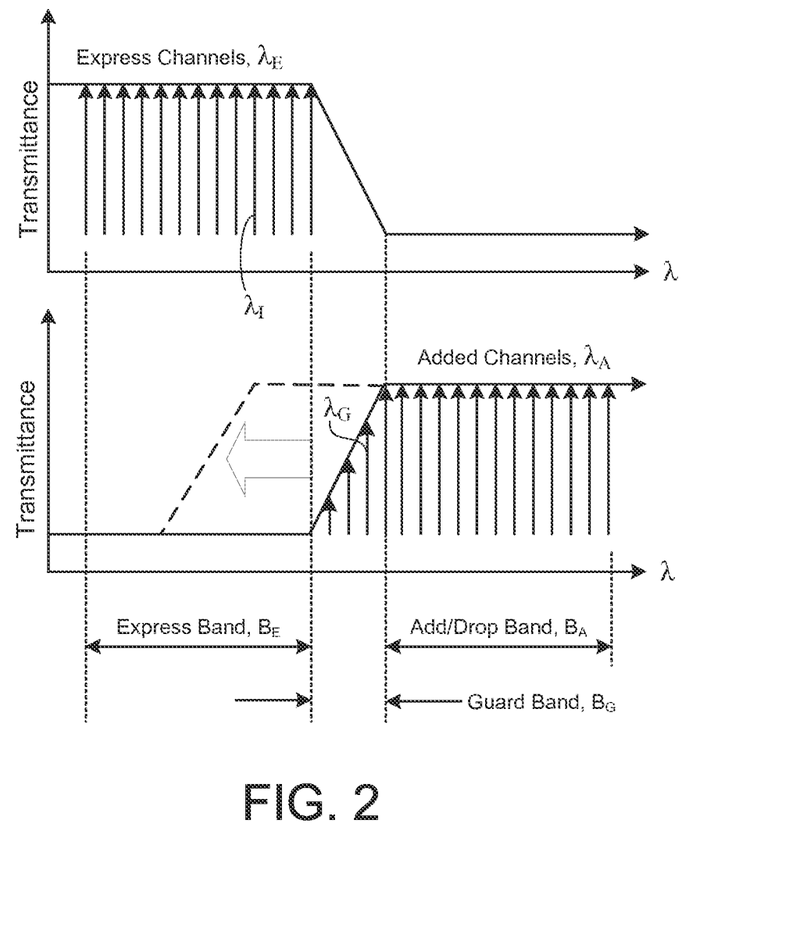
FIG. 2 is a schematic view of an exemplary transmittance having a guard band removed to form an overlap band.

Referring to FIG. 2, in some implementations, the OADM 140 has a guard band $B_G$, which is a group of guard channels or wavelengths $\lambda_G$ that resides between information bearing wavelengths $\lambda_I$. A wavelength $\lambda$ designated as a guard channel $\lambda_G$ is not relied on to carry information and is considered a sacrificial wavelength $\lambda$. In other words, guard bands $B_G$ are used to protect information bearing wavelengths $\lambda_I$ residing in adjacent bands B, such as express wavelengths $\lambda_E$ or added wavelengths $\lambda_A$, from spectral distortion while traversing an OADM 140. Locating guard band $B_G$ between pass-through or express bands $B_E$ of channels $\lambda$ and added/dropped bands $B_A$ of channels $\lambda$ protects pass-through and added/dropped channels $\lambda$ from asymmetry and high loss penalties by allowing the guard band $B_G$ to absorb those penalties.

Figure 3:
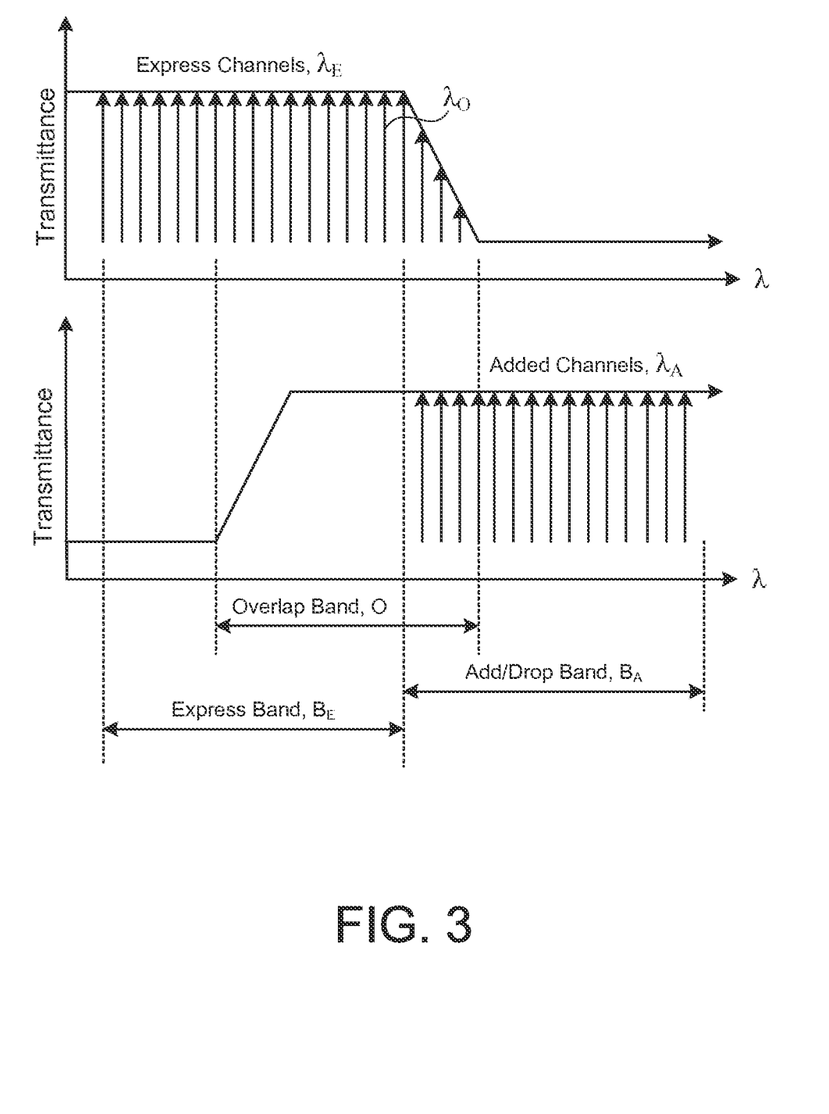
FIG. 3 is a schematic view of an exemplary transmittance having an overlap band of wavelengths dedicated to one of two communications forming the transmittance.

Referring to FIGS. 2 and 3, using a guard band $B_G$ to separate spectrum, however, results in the loss of valuable spectrum. Submarine cables 102 typically have a total spectrum of 4 THz and guard bands $B_G$ typically have a width of 200-300 GHz, resulting in at least 5% of lost spectrum to each guard bands $B_G$. To eliminate this diminishing affect, the OADM(s) 140 may filter the optical signals 105 so that adjacent bands B overlap by a certain number of channels $\lambda$ in an overlap band $B_O$, rather than being separated by a guard band $B_G$. This allows for the full use of the spectrum. The overlap band $B_O$ of channels/wavelengths $\lambda$ includes common wavelengths $\lambda$ between a spectral edge E of the first band B of wavelengths $\lambda$ and a spectral edge E of the second band B of wavelengths $\lambda$, and guard band $B_G$ with sacrificed channels $\lambda_G$.

Overlapping spectrum may result in collision of common channels $\lambda$ from two terminals/stations 110, 120, 130, if both terminals/stations 110, 120, 130 send channels $\lambda$ in the overlapping band $B_O$ of the spectrum. To prevent collisions, one terminal 110, 120, 130 of a fiber pair may have priority over another terminal 110, 120, 130 for using overlap channels $\lambda_O$ of the overlap band $B_O$.

Referring to FIGS. 1 and 3, in some implementations, a system rule determines usage of the overlap channels $\lambda_O$. For example, channels/wavelengths $\lambda$ from the first trunk terminal 110 to the second trunk terminal 120 or from the branch terminal 130 to the second trunk terminal 120 may use the overlap channels $\lambda_O$. Additionally or alternatively, the overlap channels $\lambda_O$ may be reserved for express channels/wavelengths $\lambda_E$ of an express band $B_E$ between the first and second trunk terminals 110, 120. Different rules may apply, and the terminals 110, 120, 130 may agree to different rules for various conditions.

The OADM 140 may include one or more tunable filters 142 that produce the overlap band $B_O$. The overlap band $B_O$ may have a set/standard size or variable size to fit different applications. In each case, the terminals 110,120, 130 may agree on which terminal 110,120, 130 uses the overlap channels $\lambda_O$ of the overlap band $B_O$ for all, some, or particular transmissions of optical signals 105. One or more of the terminals 110,120, 130 and/or a spectrum manager 160 may manage the overlap band $B_O$. In some examples, the spectrum manager 160 tunes the filter(s) 142 of the OADM(s) 140 to provide a fixed or variable sized overlap band $B_O$. Moreover, the spectrum manager 160 may manage usage of the overlap band $B_O$ by the terminals 110, 120, 130, by setting and/or enforcing rules of overlap band usage.

While in some implementations, the OADM branching unit 140 assigns (e.g., at the direction of a terminal 110, 120,130 or a spectrum manager 160) all of the overlap channels $\lambda_O$ of the overlap band $B_O$ to one terminal 110, 120, 130; in other implementations, the OADM branching unit 140 assigns (e.g., at the direction of a terminal 110, 120,130 or a spectrum manager 160) a number of overlap channels $\lambda_O$ of the overlap band $B_O$ to one terminal 110, 120, 130 and a remaining number of overlap channels $\lambda_O$ of the overlap band $B_O$ to another terminal 110, 120, 130. The OADM branching unit 140 may split the overlap band $B_O$ evenly or unevenly between two terminals 110, 120, 130.

To implement optical add-drop multiplexing in the branching unit 140, the branching unit 140 may implement three functions: splitting, filtering and combining. With regard to the splitting function, optical power on one input fiber to the configuration is split into two or more outgoing fibers. An optical coupler is one example of a device that can implement the splitting function. Filtering involves blocking/transmitting portion of input optical spectrum from one or more outgoing fibers. An attenuator and an all-pass filter are examples of filter configurations that do not discriminate by optical wavelength. Optical filters that transmit or block one or more specific wavelength bands can be implemented using technologies known to those of ordinary skill in the art, e.g., thin films and fiber Bragg gratings. The combining function involves merging optical signals from two or more sources onto a single output fiber. An optical coupler is one example of a device that can implement the combining function.

In some examples, the OADM branching unit 140 includes three filter types: a band pass filter drop (BPF-D) 142d, a band pass filter add (BPF-A) 142a, and a band reuse filter (BRF) 142r. In the event that the optical cable segments 102 coupled to the branching unit 140 is repeaterless, BRF-A 142a and BRF-D 142d may be optional. The filters may have fixed or reconfigurable transmittance characteristics.

Figure 4:
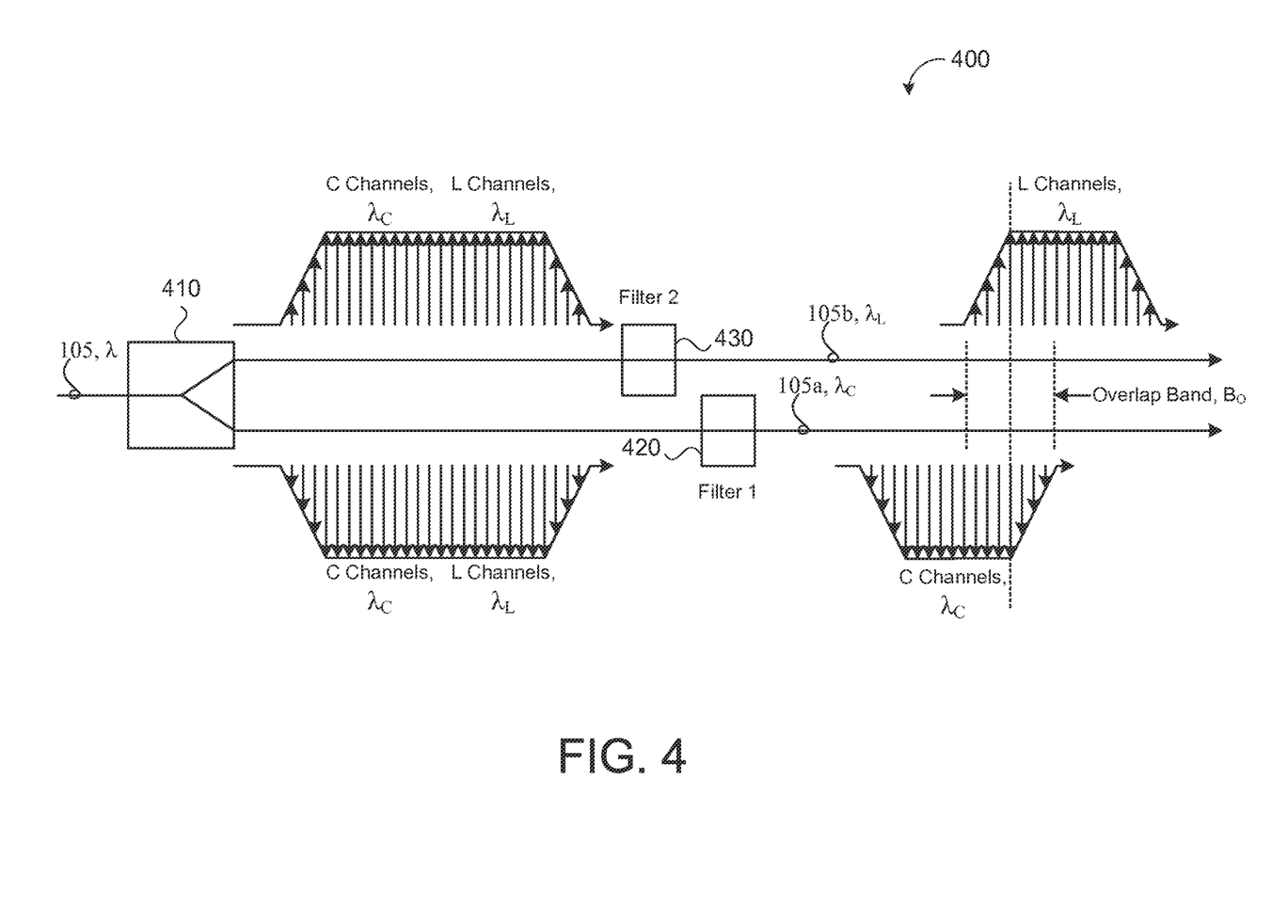
FIG. 4 is a schematic view of an exemplar optical communication system using C- and L-band wavelengths.
Figure 5:
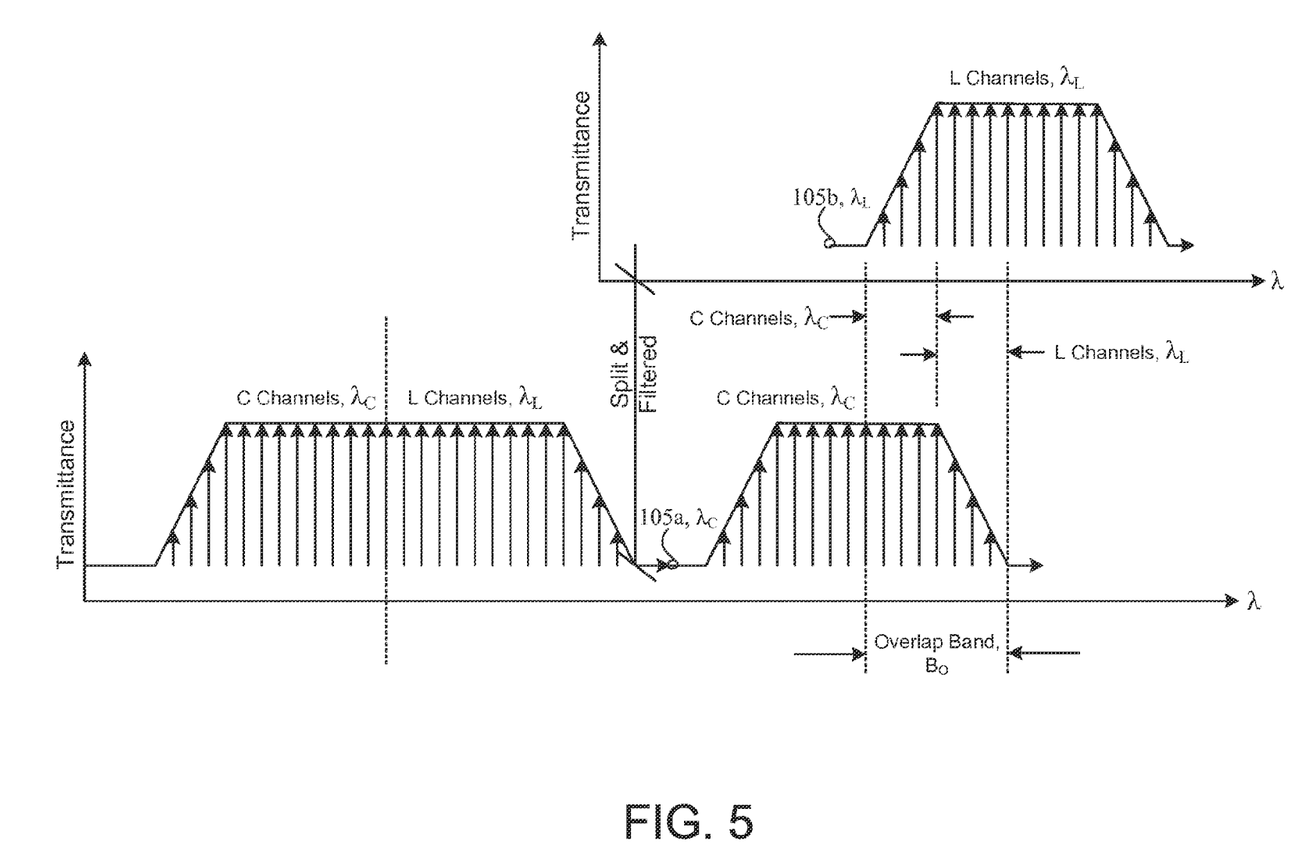
FIG. 5 is a schematic view of an exemplary transmittance having an overlap band of wavelengths split between two communications of the transmittance.

Referring to FIGS. 4 and 5, in some implementations, the concept of using an overlap band $B_O$ versus a guard band $B_G$ to merge, rather than separate bands B can be applied to spectrums that include conventional (C) and long (L) bands of wavelengths $\lambda$. An optical system 400 may include a splitter 410 that splits a signal 105 including both C and L band wavelengths $\lambda_C$, $\lambda_L$ in half (50/50 split) into first and second sub-signals 105a, 105b. A first fitter 420 filters out (e.g., a drop filter drops) L band wavelengths $\lambda_L$ from the first sub-signal 105a, and a second filter 430 filters out (e.g., a drop filter drops) C band wavelengths $\lambda_C$ from the second sub-signal 105b. The resulting first sub-signal 105a includes only C band wavelengths $\lambda_C$, and the second sub-signal 105b includes only L band wavelengths $\lambda_L$. The optical system 400 may have a rule that an overlapping band $B_O$ C and L band wavelengths $\lambda_C$, $\lambda_L$ is dedicated to one band of wavelengths $\lambda_C$, $\lambda_L$ or another or fractionally divided between the two bands of wavelengths $\lambda_C$, $\lambda_L$. In the example shown, the optical system 400 divides the overlap band $B_O$ equally, 50/50, between the C and L band wavelengths $\lambda_C$, $\lambda_L$. As such, both the C channels and the L channels benefit from the overlap band $B_O$ equally. The overlap $B_O$ eliminates any spectral gap between the C-bands and the L-bands, and thus avoids any loss of speculum incurred by spectral gaps.

Figure 6:
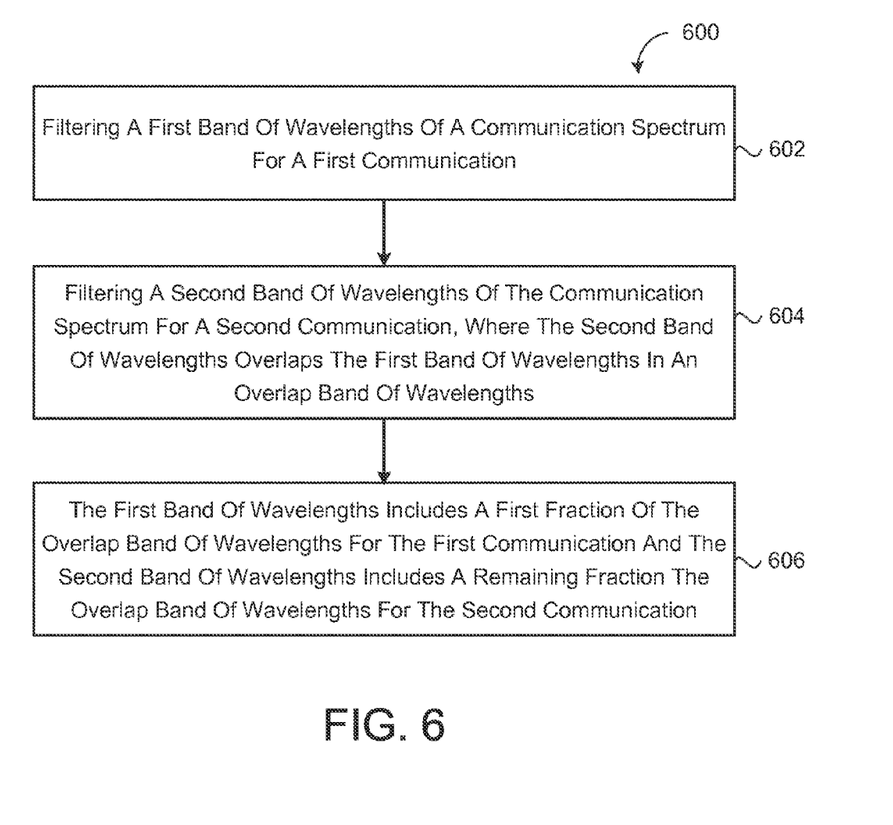
FIG. 6 is a schematic view of an exemplary arrangement of operations for a method of optical communication.

FIG. 6 is a schematic view of an exemplary arrangement of operations for a method 600 of optical communication that includes filtering 602 a first band $B_E$, C of wavelengths $\lambda_E$, $\lambda_C$ of a communication spectrum for a first communication 105a and filtering 604 a second band $B_A$, L of wavelengths $\lambda_A$, $\lambda_L$ of the communication spectrum for a second communication 105b. The second band $B_A$, L of wavelengths $\lambda_A$, $\lambda_L$ overlaps the first band $B_E$, C of wavelengths $\lambda_E$, $\lambda_C$ in an overlap band $B_O$ of wavelengths $\lambda_O$. The first band $B_E$, C of wavelengths $\lambda_E$, $\lambda_C$ includes a first fraction of the overlap band $B_O$ of wavelengths $\lambda_O$ for the first communication 105a and the second band $B_A$, L of wavelengths $\lambda_A$, $\lambda_L$ includes a remaining fraction the overlap band $B_O$ of wavelengths $\lambda_O$ for the second communication 105b.

In some implementations, the first band $B_E$, C of wavelengths $\lambda_E$, $\lambda_C$ includes the entire overlap band $B_O$ of wavelengths $\lambda_O$ for the first communication 105a and the second band $B_A$, L of wavelengths $\lambda_A$, $\lambda_L$ excludes the overlap band $B_O$ of wavelengths $\lambda_O$ from the second communication 105b. Other delegations of the overlap band $B_O$ are possible as well.

The overlap band $B_O$ of wavelengths $\lambda_O$ may include common wavelengths $\lambda$ between a spectral edge E of the first band $B_E$, C of wavelengths $\lambda_E$, $\lambda_C$ and a spectral edge E of the second hand. $B_A$, L of wavelengths $\lambda_A$, $\lambda_L$. In some examples, the first filter 142, 420 and/or the second filter 142, 430 provide a fixed sized overlap band $B_O$ of wavelengths $\lambda_O$ of the communication spectrum. In other examples, the first filter 142, 420 and/or the second filter 142, 430 are tunable to provide a variable sized overlap band $B_O$ of wavelengths $\lambda_O$ of the communication spectrum. The filtering may include adding, dropping, and/or reusing wavelengths $\lambda$.

In some implementations, the method includes receiving the first communication 105a from a first trunk terminal 110, where the first communication 105a is destined for a second trunk terminal 120 coupled by a communication trunk 102 with the first trunk terminal 110. The method also includes receiving the second communication 105b from a branch terminal 130 coupled to the communication trunk 102. The overlap band $B_O$ of wavelengths $\lambda_O$ may be reserved for communications between the first and second trunk terminals 110, 120.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of implementations have been described. Nevertheless, it will be understood that various modifications may be made without departing from the spirit and scope of the disclosure. Accordingly, other implementations are within the scope of the following claims.

What is claimed is:

1. An optical add-drop multiplexer comprising:
a first filter configured to receive a communication signal and filter a first band of wavelengths of a communication spectrum for a first communication segment, the first band of wavelengths having a first spectral edge and comprising first guard band wavelengths adjacent the first spectral edge and first information bearing wavelengths adjacent the first guard band wavelengths; and
a second filter in parallel with the first filter, the second filter configured to receive the communication signal and filter a second band of wavelengths of the communication spectrum for a second communication segment, the second band of wavelengths having a second spectral edge and comprising second guard band wavelengths adjacent the second spectral edge and second information bearing wavelengths adjacent the second guard band wavelengths, the second band of wavelengths overlapping the first band of wavelengths in an overlap band of wavelengths, the overlap band of wavelengths including a threshold number of common wavelengths between the first spectral edge of the first band of wavelengths and the second spectral edge of the second band of wavelengths, at least one information bearing wavelength of one band of wavelengths overlapping at least one guard band wavelength of the other band of wavelengths;
wherein the first communication segment includes the first band of wavelengths and a first fraction of the overlap band of wavelengths and the second communication segment includes the second band of wavelengths and a remaining fraction of the overlap band of wavelengths for the second communication segment.

2. The optical add-drop multiplexer of claim 1, wherein the first filter and/or the second filter provide a fixed sized overlap band of wavelengths of the communication spectrum.

3. The optical add-drop multiplexer of claim 1, wherein the first filter and/or the second filter are adjustable to provide a variable sized overlap band of wavelengths of the communication spectrum.

4. The optical add-drop multiplexer of claim 1, wherein filtering comprises adding, dropping, and/or reusing wavelengths.

5. An optical system comprising:
a first trunk terminal;
a second trunk terminal;
a communication trunk coupling the first trunk terminal to the second trunk terminal; and
a branching unit disposed along the communication trunk and coupling a branch terminal to the communication trunk, the branching unit comprising an optical add-drop multiplexer comprising:
a first filter configured to receive a communication signal and filter a first band of wavelengths of a communication spectrum for a first communication segment, the first band of wavelengths having a first spectral edge and comprising first guard band wavelengths adjacent the first spectral edge and first information bearing wavelengths adjacent the first guard band wavelengths; and
a second filter in parallel with the first filter, the second filter configured to receive the communication signal and filter a second band of wavelengths of the communication spectrum for a second communication segment, the second band of wavelengths having a second spectral edge and comprising second guard band wavelengths adjacent the second spectral edge and second information bearing wavelengths adjacent the second guard band wavelengths, the second band of wavelengths overlapping the first band of wavelengths in an overlap band of wavelengths, the overlap band of wavelengths including a threshold number of common wavelengths between the first spectral edge of the first band of wavelengths and the second spectral edge of the second band of wavelengths, at least one information bearing wavelength of one band of wavelengths overlapping at least one guard band wavelength of the other band of wavelengths;

wherein the first communication segment includes the first band of wavelengths and a first fraction of the overlap band of wavelengths and the second communication segment includes the second band of wavelengths and a remaining fraction of the overlap band of wavelengths for the second communication segment.

6. The optical system of claim 5, wherein the overlap band of wavelengths is reserved for communications between the first and second trunk terminals.

7. The optical system of claim 5, wherein the first filter and/or the second filter provide a fixed sized overlap band of wavelengths of the communication spectrum.

8. The optical system of claim 5, wherein the first filter and/or the second filter are tunable to provide a variable sized overlap band of wavelengths of the communication spectrum.

9. The optical system of claim 5, wherein filtering comprises adding, dropping, and/or reusing wavelengths.

10. A method comprising:

receiving a communication signal at a first filter of an optical add-drop multiplexer and filtering a first band of wavelengths of a communication spectrum for a first communication segment, the second band of wavelengths having a second spectral edge and comprising second guard band wavelengths adjacent the second spectral edge and second information bearing wavelengths adjacent the second guard band wavelengths; and receiving the communication signal at a second filter of the optical add-drop multiplexer, the second filter in parallel with the first filter and filtering a second band of wavelengths of the communication spectrum for a second communication segment, the second band of wavelengths having a second spectral edge and comprising second guard band wavelengths adjacent the second spectral edge and second information bearing wavelengths adjacent the second guard band wavelengths, the second band of wavelengths overlapping the first band of wavelengths in an overlap band of wavelengths, the overlap band of wavelengths including a threshold number of common wavelengths between the first spectral edge of the first band of wavelengths and the second spectral edge of the second band of wavelengths, at least one information bearing wavelength of one band of wavelengths overlapping at least one guard band wavelength of the other band of wavelengths;

wherein the first communication segment includes the first band of wavelengths includes a first fraction of the overlap band of wavelengths and the second communication segment includes the second band of wavelengths and a remaining fraction of the overlap band of wavelengths for the second communication segment.

11. The method of claim 10, wherein the filtering provides a fixed sized overlap band of wavelengths of the communication spectrum.

12. The method of claim 10, wherein the filtering provides a variable sized overlap band of wavelengths of the communication spectrum.

13. The method of claim 10, wherein filtering comprises adding, dropping, and/or reusing wavelengths.

14. The method of claim 10, further comprising:

receiving the first communication from a first trunk terminal, the first communication destined for a second trunk terminal coupled by a communication trunk with the first trunk terminal;

and receiving the second communication from a branch terminal coupled to the communication trunk.

15. The method of claim 14, wherein the overlap band of wavelengths is reserved for communications between the first and second trunk terminals.

\* \* \* \* \*